(12) United States Patent
Talarek

(10) Patent No.: US 6,628,679 B1
(45) Date of Patent: Sep. 30, 2003

(54) SERDES (SERIALIZER/DESERIALIZER) TIME DOMAIN MULTIPLEXING/DEMULTIPLEXING TECHNIQUE

(75) Inventor: Wieslaw Talarek, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/474,751

(22) Filed: Dec. 29, 1999

(51) Int. Cl.[7] .................................................. H04J 3/04
(52) U.S. Cl. ....................................................... 370/536
(58) Field of Search ................................. 370/535, 536, 370/537, 539, 540, 541, 542, 544; 327/407, 415, 365

(56) References Cited

U.S. PATENT DOCUMENTS

| | | | |
|---|---|---|---|
| 4,759,014 A | * 7/1988 | Decker et al. | 370/503 |
| 5,231,636 A | * 7/1993 | Rasmussen | 327/387 |
| 5,398,241 A | * 3/1995 | Witchey | 370/391 |
| 5,563,885 A | * 10/1996 | Witchey | 370/391 |
| 5,828,256 A | * 10/1998 | Kurisu | 327/161 |
| 5,892,920 A | * 4/1999 | Arvidsson et al. | 709/233 |
| 5,940,456 A | * 8/1999 | Chen et al. | 375/356 |

OTHER PUBLICATIONS

Chen Loop-free asynchronous data sharing in multiprocessor real-time systems based on timing properties. Real time computing systems and applications, 1999. RTCSA '99. Sixth International conference, 1999, pp. 236–246.*

* cited by examiner

*Primary Examiner*—Hassan Kizou
*Assistant Examiner*—Dmitry Levitan
(74) *Attorney, Agent, or Firm*—Antonelli, Terry, Stout & Kraus, LLP (57) ABSTRACT

A SERDES (serializer/deserializer) time domain multiplexer/demultiplexer multiplexes N input signals into a single output signal. In multiplexing the N input signals, each input signal utilizing its respective clock is latched in a respective one of N latches whose respective outputs are respectively inputted into N circular buffers. The outputs of the N circular buffers are inputted to a multiplexer whose output is outputted to a latch. In demultiplexing an input signal into N output signals, the input signal is latched in N respective latches whose outputs are inputted to N respective circular buffers. The outputs of the N respective circular buffers are inputted to N respective output latches. The N output latches are clocked by N respective output clock inputs which are different from the N respective input clocks used to clock the N respective input latches.

15 Claims, 5 Drawing Sheets

SERDES (SERIALIZER/DESERIALIZER) TIME DOMAIN MULTIPLEXING/ DEMULTIPLEXING TECHNIQUE

FIELD

The present invention relates to a SERDES (serializer/deserializer) time domain multiplexing/demultiplexing technique, and more particularly, to a SERDES time domain multiplexing/demultiplexing technique which utilizes circular buffers for multiplexing and demultiplexing and time alignment functions.

BACKGROUND

At present, popularly used time domain multiplexers operate so as to multiplex serial data stream signals which are aligned in phase. That is, these time domain multiplexers do not allow for clock skew which makes them unusable where it is desired to time domain multiplex two or more serial data stream signals which are not aligned in phase.

Similarly, time domain demultiplexers do not allow for demultiplexing one serial data stream signal into two or more serial data stream signals which are not aligned in phase.

SUMMARY

A time domain multiplexing/demultiplexing technique multiplexes N input signals into a single output signal, N being an integer greater than 1, and vice versa. N input signals and N clocks are respectively received and the N input signals are then stored in N respective latches in accordance with the N respective clocks. Outputs of the N latches are sequentially stored in N circular buffers in accordance with the N respective clocks. Outputs from the N circuital buffers are respectively outputted into a multiplexer in accordance with N respective system clocks. One of the respective outputs of the N circular buffers is selectively output to an output latch in accordance with a multiplexer clock input, the output latch latching the output of the multiplexer in accordance with another system clock having a frequency which is N times that of the N input clocks, an output of the output latch providing a time domain multiplexed signal corresponding to the N input signal. A divider outputs an output clock in response to the another system clock.

BRIEF DESCRIPTION OF THE DRAWING(S)

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Before beginning a detailed description of the subject invention, a mention of the following is in order. While the subject invention is discussed below in terms of various digital circuit elements, it is to be understood that the subject invention is not limited to these elements but rather other equivalent elements achieving the same effects may be substituted therefor. In addition, while the subject invention has been discussed below in terms of hardware elements, it is to be noted that the subject invention is equally applicable to software programmed in a processor.

Figure 1:
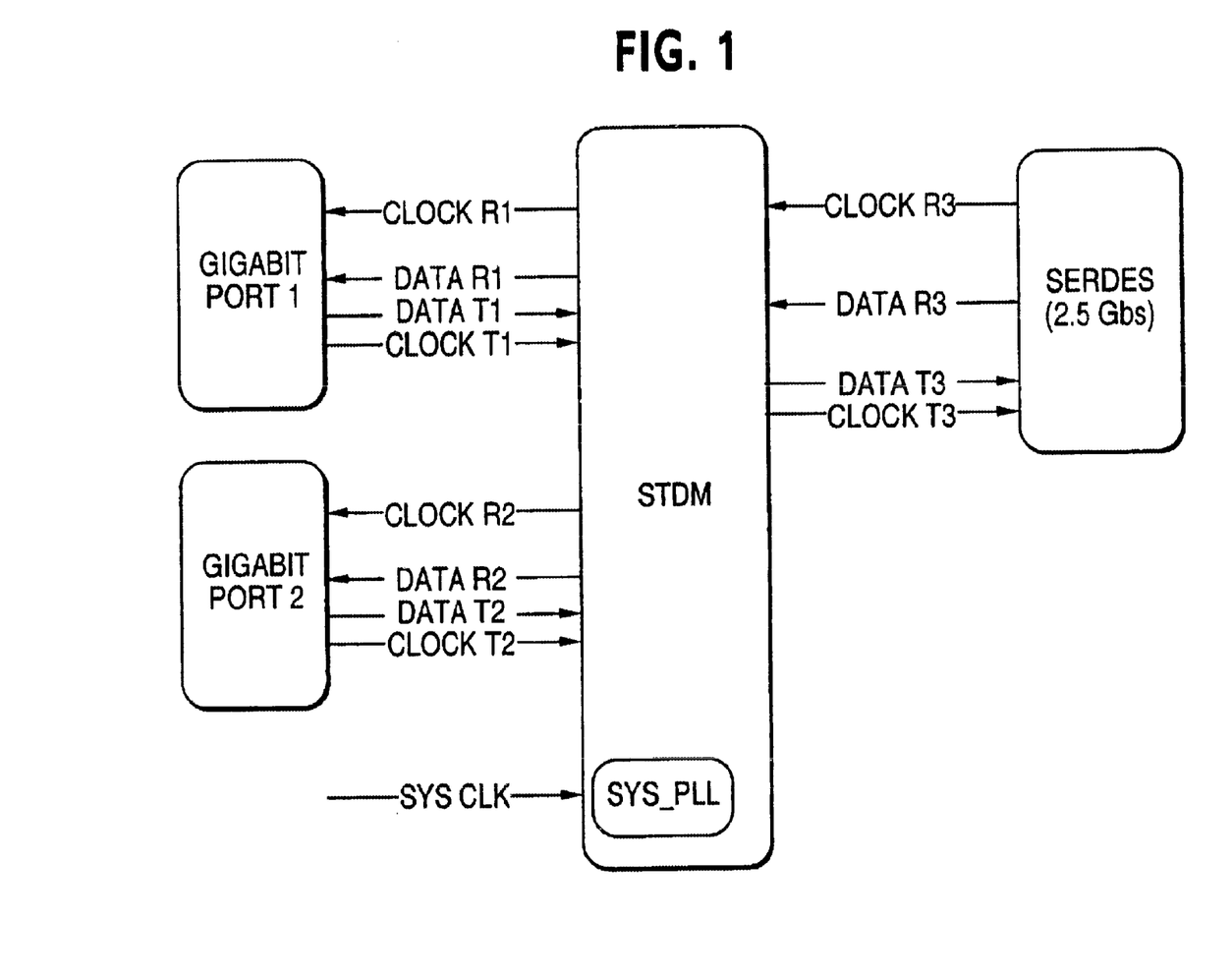
FIG. 1 is a block diagram of an example system interface between a SERDES time domain multiplexer/demuiltiplexer (STDM) and a pair of GigaBit ports and a SERDES.

FIG. 1 is a block diagram of an example system interface between a SERDES time domain multiplexer/demultiplexer in accordance with an example embodiment of the present invention and other system elements. In the example shown in FIG. 1, GigaBit port 1 and GigaBit port 2, for example, each transmit and receive a digital data stream at a 1.25 Gigabit rate. Each digital data stream contains 10 bits at a clock rate of 125 MHz (single data rate transfer). That is, data is transmitted on only one edge (either raising or falling edge) of a 125 MHz transmit clock.

In the ideal situation, the digital data streams outputted from GigaBit ports 1 and 2 and their corresponding clock signals would be aligned in phase. This would allow for easily time multiplexing the two data streams to produce a single data stream at twice the data rate.

However, various time delays inherently occur in actual systems such that the data streams and respective clocks outputted from GigaBit ports 1 and 2 are not aligned in phase, thereby necessitating the time domain multiplexer/demultiplexer technique of the present invention.

The SERDES time domain multiplexer/demultiplexer (STDM) combines the two 1.25 Gigabit data streams from GigaBit port 1 and GigaBit port 2 by time domain multiplexing to produce a singe 2.5 Gigabit data stream containing 10 bits at 125 MHz (double data rate transfer). That is, the data is transmitted on both edges of a 125 MHz transmit clock. This 2.5 Gigabit data stream is transmitted to a SERDES.

The use of the time domain multiplexing in accordance with the present invention allows the combining of two digital data streams at a first data rate into a single digital data stream at twice the data rate. This allows for the transmission of serial digital data at twice the data rate of the two separate digital data streams, thereby increasing the efficiency and lowering the effective cost of digital data transmission.

In a reverse data direction, the SERDES in turn transmits a 2.5 Gigabit data stream, containing 10 bits at 125 MHz double data rate transfer, to the SERDES time domain multiplexer/demultiplexer where this single 2.5 Gigabit data stream is demultiplexed into two 1.25 Gigabit data streams, containing 10 bits at a 125 MHz single data rate transfer, these data streams being synchronous with the rising edge of each respective clock. These two data streams are then transmitted to GigaBit port 1 and GigaBit port 2.

Note that an example embodiment of the SERDES time domain multiplexer/demultiplexer in accordance with the present invention has been illustrated in FIG. 1 as time domain multiplexing two serial data streams into one and time domain demultiplexing one serial data stream into two serial data streams. However, as will be discussed later, the present invention is not limited to multiplexing two serial data streams into one and vice versa, but rather can be applied to multiplexing N data streams into one data stream at N times the data rate and demultiplexing one data stream into N data streams each having a data rate of 1÷N, where N is an integer greater than 1.

In the transmit interface between GigaBit port 1 and the SERDES time domain multiplexer/demultiplexer and GigaBit port 2 and the SERDES time domain multiplexer/demultiplexer, the data streams are aligned time wise in the SERDES time domain multiplexer/demultiplexer so that the signal groups of GigaBit port 1 and GigaBit port 2 can be clocked by clocks which are shifted in phase from each other.

The following is an explanation of how the data leaving demultiplexer, Data R1 and R2 of FIG. 1 is synchronized. First, the Data R1 is inputted into GigaBit port 1 and Data R2 is inputted into GigaBit port 2 or some internal synchronization occurs prior to the Data R1 and R2 reaching the GigaBit Ports (not shown), irrespective of the port that Data R1 and R2 arrives at.

Due to clock skews between the SERDES shown in FIG. 1 and SERDES sending data to it (not shown), the received data might arrive miss-aligned. The SERDES are fed from different system clocks that might be out of phase. So, Data R2 might be inputted to GigaBit port 1 and Data R1 might be inputted to GigaBit port 2. However, there are many ways to synchronize the Data R1 and R2, and the following is a description of one learning method that applies to packetized data streams.

For example, a header that contains unique port number is attached to each of the data streams Data T1 and Data T2. T1 and T2 are multiplexed and are inputted to the SERDES, which sends the data to another receiving SERDES (not shown in FIG. 1). The latter SERDES demultiplexes the data to two streams, and circular buffers in the multiplexer of the present invention provides for Data R1 and R2. The received data fed to the GigBit ports might be miss-aligned as described above. However, Data R1 and R2 will be switched to the correct port based on the header-port number. So, even if Data R1 is fed to GigaBit port 2, the header will contain information that the packet came from the port 1 (Data T1) and will be switched to the port 1.

As shown in FIG. 1, the STDM may include a system phase lock loop circuit SYS_PLL that receives SYS CLK. FIG. 1 also shows the signals CLOCK R3, DATA R3, DATA T3 and CLOCK T3 between the STDM and the SERDES.

Figure 2:
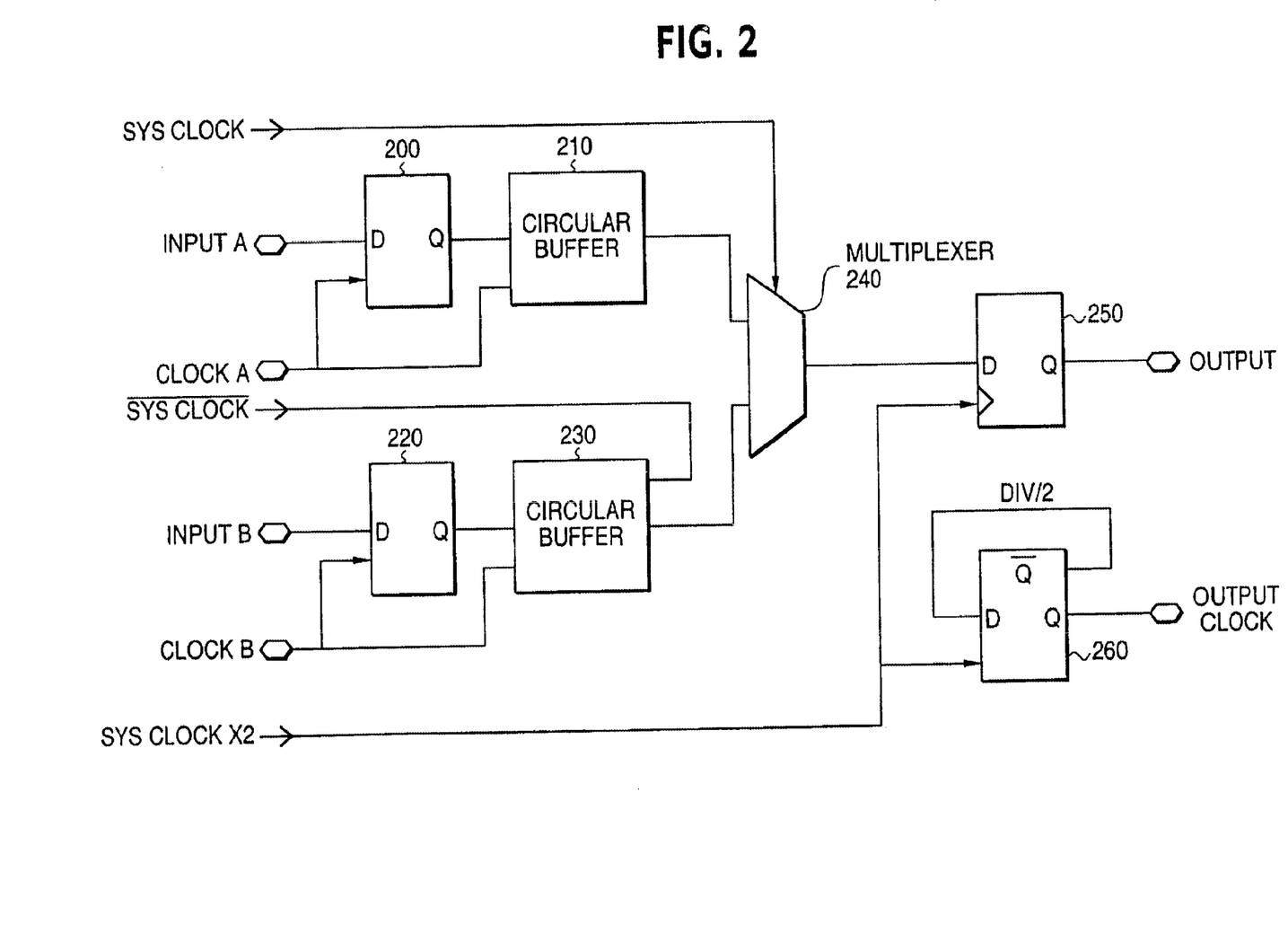
FIG. 2 illustrates an example time division multiplexer for multiplexing two input signals into one output signal in accordance with an example embodiment of the present invention.

FIG. 2 illustrates the multiplexing portion of the SERDES time domain multiplexer/demultiplexer in accordance with the present invention. The multiplexer consists of a D type flip flop 200 feeding a circular buffer (10 bits by M deep) 210, the value of M being discussed later. The D flip flop 200 receives an input A and a clock A which in the case of the example illustrated in FIG. 1, comes from GigaBit port 1.

The multiplexer also includes a D flip flop 220 which feeds a circular buffer (10 bits by M deep) 230. The D flip flop 220 receives an input B and clock B which, in this example, receives input signals from GigaBit port 2.

The outputs of the circular buffers 210 and 230 are fed to a multiplexer 240. The multiplexer 240 is controlled by a system clock which also clocks the output of the circular buffer 210. An inverted system clock clocks the output of circular buffer 230.

The output of the multiplexer 240 is input to a D flip flop 250 whose output forms the output of the SERDES time domain multiplexer/demultiplexer. The D flip flop 250 is fed by a system clock at twice the frequency of the system clock controlling the multiplexer 240 and circular buffer 210. This system clock X2 is also used as a clock for D type flip flop 260 whose output forms the output clock of the SERDES time domain multiplexer/demultiplexer.

To minimize input data skew, the incoming data (input A and input B) is immediately respectively clocked into the D flip flops 200 and 220. To minimize output data skew between the output clock and the output, the system clock x 2 (e.g.—a 250 MHz clock) is divided in half to obtain the output clock (e.g.—a 125 MHz clock).

A circular buffer, such as the circular buffers 210 and 230, implement a bounded queue, that is, a data structure that behaves like a check-out line at the supermarket. Information is added to the back end of the queue and removed from the front. Unlike the supermarket line, the circular buffer has a fixed maximum capacity.

Circular buffers are commonly used for communication between two sequential processes. One process, called the producer, places information into the circular buffer and the other process, called the consumer, takes it out. Circular buffers and their application are discussed in detail in U.S. Pat. Nos. 5,457,786, 5,924,114, 5,923,900, 5,745,793 and 5,832,307. Accordingly, a detailed description of a circular buffer has been omitted for the sake of brevity.

Figure 3:
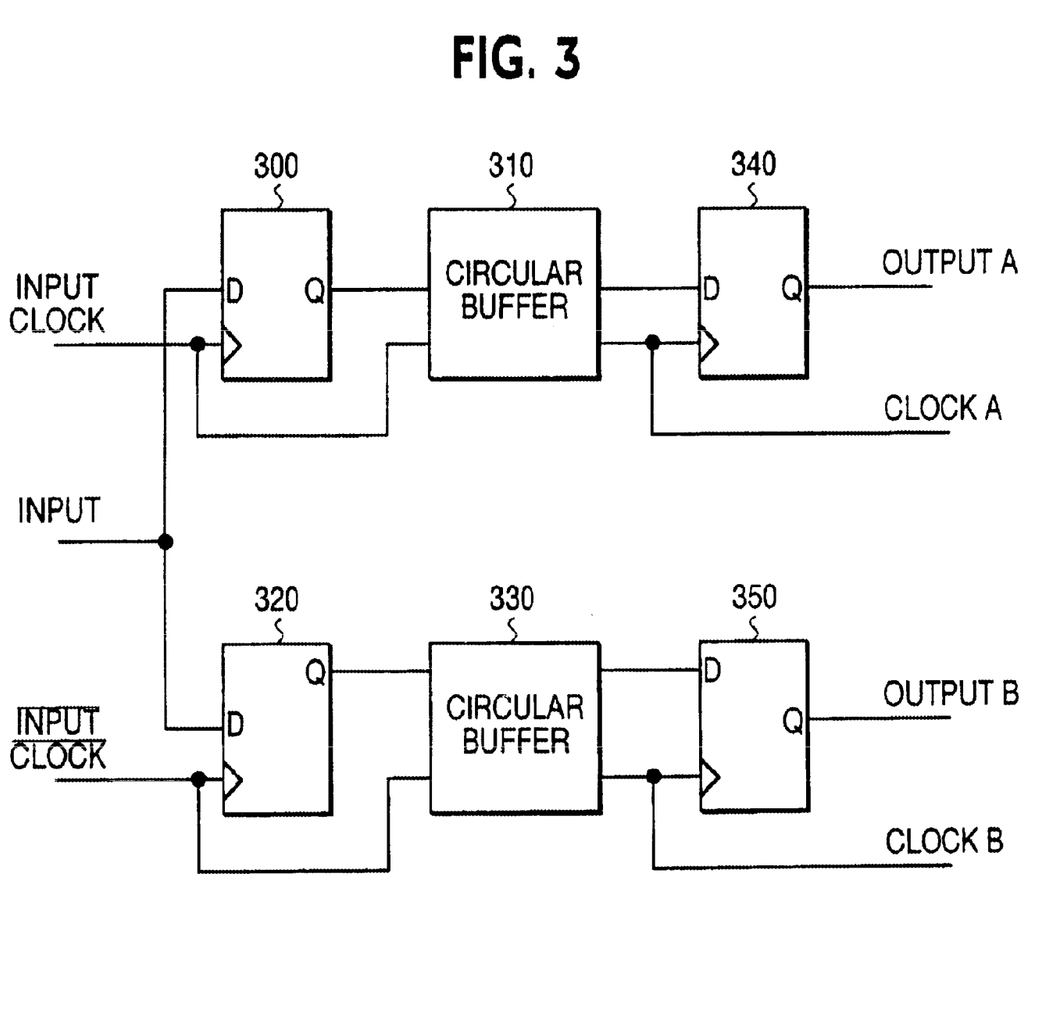
FIG. 3 illustrates an example time division demultiplexer in accordance with an example embodiment of the present invention for demultiplexing one input signal into two output signals.

FIG. 3 discloses the demultiplexing portion of the SERDES time domain multiplexer/demultiplelxer in accordance with the present invention. The single data input requiring demultiplexing is input into D type flip flops 300 and 320. The D flip flop 300 receives an input clock related to the data input while the flip flop 320 receives an inverted input clock.

The outputs of flip flops 300 and 320 respectively feed circular buffers 310 and 330. The input clock that feeds D flip flop 300 also clocks the input of the circular buffer 310 while the inverted input clock that is input into D flip flop 320 also clocks the input of the circular buffer 330.

The output of the circular buffer 310 is fed to the input of D type flip flop 340 while the output of circular buffer 330 is fed to the input of D type flip flop 350. Clock A, which has a rate one-half that of the input clock is used to clock the output of the circular buffer 310 and D type flip flop 340 to produce an output A from D type flip flop 340 whereas clock D clocks the output of the circular buffer 330 and D flip flop 350 to produce output D from flip flop 350. To minimize input data skew, the data input is immediately clocked into flip flops 300 and 320.

The circular buffers in both FIG. 2 and FIG. 3 are utilized to account for group phase shifts and clock jitter. The depth of the circular buffers M is calculated as follows:

$$M = (FL \times J/10^6) + A_0;$$

wherein

M=the depth of the circular buffer;

FL=the frame length in bytes;

J=the clock jitter in parts per million; and $A_0$=the time alignment offset (that is—at least one clock).

The clock jitter is not cumulative and drifts +/− a maximum value. Thus, an elastic buffer is not required.

As noted above, the present invention is not limited to multiplexing two signals into one signal at twice the data rate and demultiplexing one signal at twice the data rate into two signals, but rather the present invention may be utilized to time multiplex N data streams having a data rate of 1/N into a single data stream having a data rate of N and to demultiplex a data stream having a data rate of N into N data streams each having a data rate of 1/N, where N is a positive integer greater than 1.

Figure 4:
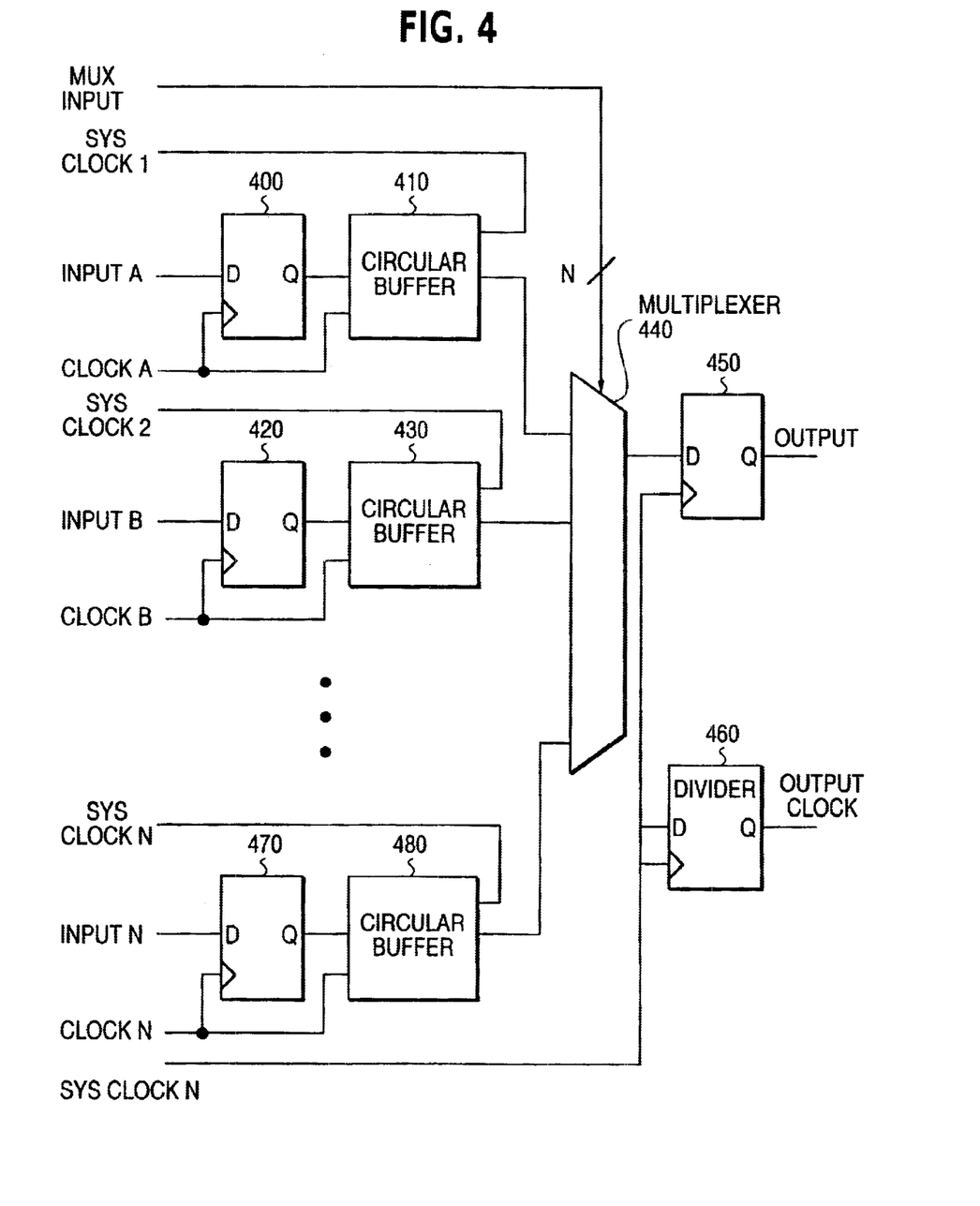
FIG. 4 illustrates an example time division multiplexer in accordance with an example embodiment of the present invention for multiplexing N input signals into one output signal.

FIG. 4 is an example of the multiplexer portion of such a SERDES time domain multiplexer/demultiplexer in which D type flip flops 400, 420, up to the Nth flip flop 470 respectively feed circular buffers 410, 430, up to the Nth circular buffer 480. The inputs of the circular buffers and their respective flip flops are clocked by clocks A, B, . . . N. U.S. Pat. No. 4,680,733 is an example of a SERDES arrangement.

The outputs of circular buffers 410, 430, up to the Nth circular buffer 480 are fed to a multiplexer 440 which receives a multiplex input for multiplexing the outputs of the circular buffers into a single signal which feeds a D type flip flop 450.

The outputs of the circular buffers are respectively clocked by system clock 1, system 2 up to the Nth system clock N. A system clock XN is used to clock the flip flop 450 and is input to a divider 460 which divides the system clock XN by N to minimize output skew between the output and the output clock. This divider 460 takes the place of the flip flop 260 in FIG. 2 which is used as a divider for dividing by 2. Since the multiplexer of FIG. 4 operates in the same fashion of that of FIG. 2, a detailed description has been omitted for the sake of brevity.

Figure 5:
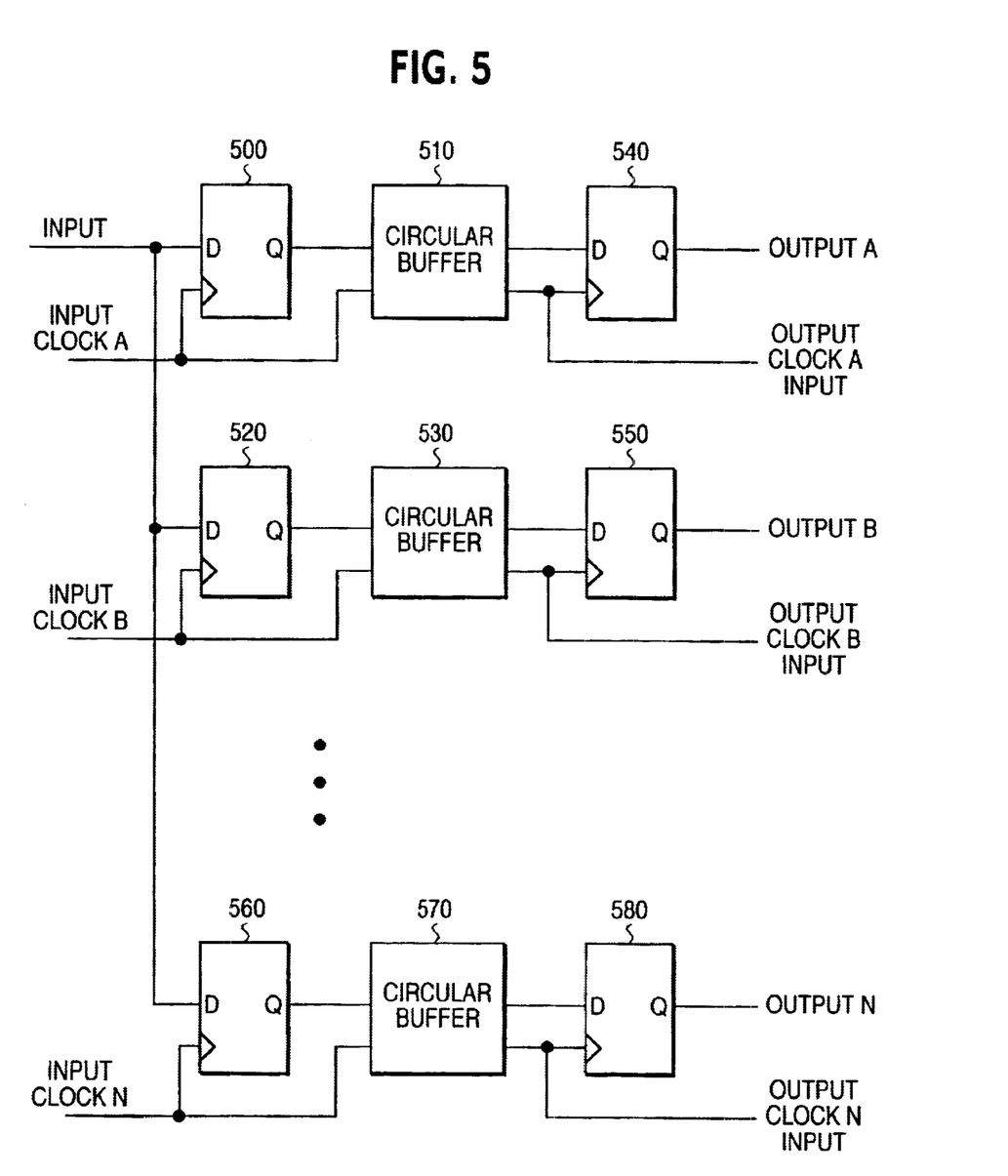
FIG. 5 illustrates an example time division demultiplexer in accordance with an example embodiment of the present invention for demultiplexing one input signal into N output signals.

In a similar fashion, the demultiplexer of the SERDES time domain multiplexer/demultiplexer in accordance with the present invention for the case of N data streams is illustrated in FIG. 5. As with the demultiplexer of FIG. 3, flip flops 500, 520 up the Nth flip flop 560 respectively feed circular buffers 510, 530 up the Nth circular buffer 570 whose outputs respectively feed flip flops 540, 550 up the Nth flip flop 580. N input clocks (input clock A to input clock N) are utilized to clock the input flip flops and the input clocking of the circular buffers whereas N clocks (output clock A to output clock N) are input to clock the outputs of the circular buffers and the inputs of their respective output flip flops.

While there have been illustrated and described what are considered to be example embodiments of the present invention, it will be understood that by the those skilled in the art that various changes and modifications may be made and equivalents may be substituted for elements thereof without departing from the true scope of the present invention. Furthermore, many modifications may be made to adapt a particular situation to the teachings of the present invention without departing from the central scope of the present invention. Therefore, it is intended that the present invention not be limited to the particular embodiment disclosed for carrying out the present invention, but that the present invention includes all embodiments falling within the scope of the appended claims.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art. For example, the frequencies discussed above are merely for illustrative purposes and the present invention is not limited to these frequencies. In addition, other circuit elements may be substituted for the elements discussed above with regard to the illustrative embodiments. Lastly, as noted previously, the present invention may be embodied in software programmed on a processor rather than in hardware as discussed above with regard to the illustrative embodiments.

What is claimed is:

1. A time domain multiplexing method for multiplexing N input signals into a single output signal, N being an integer greater than 1, comprising:

respectively receiving N input signals and N clocks and storing said N input signals in N respective latches in accordance with said N respective clocks;

sequentially storing outputs of said N latches in N circular buffers in accordance with said N respective clocks;

respectively outputting outputs from said N circular buffers into a multiplexer in accordance with N respective system clocks;

selectively outputting one of said respective outputs of said N circular buffers to an output latch in accordance with a multiplexer clock input, said output latch latching said output of said multiplexer in accordance with another system clock having a frequency which is N times that of said N input clocks, an output of said output latch providing a time domain multiplexed signal corresponding to said N input signals; and a divider for outputting an output clock in response to said another system clock.

2. A time domain demultiplexing method for demultiplexing an input signal into N output signals, N being an integer greater than 1, comprising:

receiving and latching said input signal in N latches, each of said latches latching said input signal in response to a respective one of N input clocks;

sequentially storing outputs of said N latches in N respective circular buffers in accordance with N respective input clocks;

latching respective outputs of said N circular buffers in N output latches in accordance with N respective output clock inputs, said outputs of said N respective circular buffers being in accordance with said respective output clock inputs;

wherein outputs of said N output latches comprise said N respective output signals.

3. A time domain demultiplexer apparatus comprising:

a first latch, said first latch having a data input for receiving an input signal to the demultiplexed and having a latch input for receiving an input clock, said input clock being related time wise to said input signal;

a second latch, said second latch having a data input for receiving said input signal and having a latch input for receiving an inverted input clock signal;

a first circular buffer having a data input for receiving an output of said first latch and having an input clock input for receiving said input clock;

a second circular buffer having a data input for receiving an output of said second latch and having an input clock input for receiving said inverted input clock;

a third latch, said third latch having a data input for receiving an output of said first circular buffer and having a latch input for receiving a first output clock signal, said first circular buffer receiving said first output clock signal at an output clock input thereof; and a fourth latch, said fourth latch having a data input for receiving an output of said second circular buffer and having a latch input for receiving a second clock output signal, said second circular buffer receiving said second clock output signal at an output clock input thereof;

an output of said third latch serving as a first time domain demultiplexer output and an output of said fourth latch serving as a second time domain demultiplexer output.

4. A time domain multiplexer apparatus for multiplexing N input signals into a single output signal, N being an integer greater than 1, said apparatus comprising:

N latches for respectively receiving first through Nth input signals at data inputs thereof and first through Nth input clock signal inputs at latch inputs thereof, each of said input clock signals being related time wise to its respective data input signal;

first through Nth circular buffers, said first through Nth circular buffers having data inputs for receiving respective outputs of said first through Nth latches and having input clock inputs for respectively receiving said first through Nth input clock signals;

a multiplexer having N data inputs for respectively receiving data outputs of said first through Nth circular buffers and having a multiplexer input for receiving a multiplexer input signal, said multiplexer selectively outputting one of said outputs of said first through Nth circular buffers in accordance with said multiplexer input signal, said first through Nth circular buffers having output clock inputs for respectively receiving first through Nth system clock inputs;

an output latch having a data input for receiving said output of said multiplexer and having a latch input for receiving an output system clock having a frequency N time that of said first through Nth system clocks; and a divider having a clock input for receiving said output system clock, said divider dividing the frequency of said output system clock by N;

wherein an output of said output latch serves as an output of said time domain multiplexer and an output of said divider serves as an output clock of said time domain multiplexer.

5. A time domain demultiplexer apparatus for demultiplexing an input signal into N output signals, N being an integer greater than 1, said apparatus comprising:

first through Nth latches, said first through Nth latches having a data input connected to an input signal to be demultiplexed and having respective latch inputs connected to first through Nth respective input clock inputs;

first through Nth circular buffers, said first through Nth circular buffers having a data input respectively connected to an output of said first through Nth latches and having an input clock input respectively connected to said first through Nth input clocks; and first through Nth output latches, said first through Nth output latches having data inputs respectively connected to a data output of said first through Nth circular buffers and having latch inputs respectively connected to first through Nth output clock input signals, said first through Nth circular buffers having an output clock input respectively connected to said first through Nth output clock input signals;

wherein respective outputs of said first through Nth output latches form said time domain demultiplexer outputs.

6. The apparatus of claim 3, each of said first through fourth latches comprising a flip-flop.

7. The apparatus of claim 4, each of said N latches and output latch comprising a flip-flop.

8. The apparatus of claim 5, each of said N latches and N output latches comprising a flip-flop.

9. A time domain multiplexer apparatus comprising:

a first latch, said first latch receiving a first signal to be multiplexed at a data input thereof and for receiving a first clock signal at a latch signal input thereof, said first clock signal being related time wise to said first input signal;

a first circular buffer, said first circular buffer receiving an output of said first latch at a data input thereof and receiving said first clock signal at an input clock input thereof;

a second latch, said second latch receiving a second data input signal at a data input thereof and receiving a second clock signal at a latch input thereof, said second clock signal being related time wise to said second input signal;

a second circular buffer, said second circular buffer receiving an output of said second latch at a data input thereof and receiving said second clock signal at an input clock input thereof;

a multiplexer having a first input for receiving a data output of said first circular buffer and a second data input for receiving an output of said second circular buffer and having a multiplexer input for receiving a system clock, said system clock causing said multiplexer to selectively output said output of said first and second circular buffers, said first circular buffer receiving said system clock at its output clock input and said second circular buffer receiving an inverted system clock at its output clock input;

a third latch, said third latch having a data input connected to said output of said multiplexer and having a latch input for receiving a clock signal at twice the system clock frequency; and a frequency divider having a clock input connected to said clock having a frequency twice that of said system clock;

wherein an output of said third latch forms an output of said time domain multiplexer and an output of said divider forms an output clock of said time domain multiplexer.

10. The apparatus of claim 9, said first through third latches each comprising a flip flop and said divider comprising a flip flop having an inverted output thereof connected to a data input thereof.

11. A time domain multiplexing method comprising:

receiving and storing a first input signal in a first latch, said first latch being latched by a first clock signal related time wise to said first input signal;

receiving and storing a second input signal in a second latch, said second latch being latched by a second clock signal, said second clock signal being related time wise to said second input signal;

sequentially storing outputs of said first latch in a first circular buffer in accordance with said first clock signal;

sequentially storing outputs of said second latch in a second circular buffer in accordance with said second clock signal;

multiplexing outputs of said first and second circular buffers in a multiplexer, said multiplexer selectively outputting said outputs of said first and second circular buffers in accordance with a system clock, wherein said output of said first circular buffer is in accordance with said system clock and said output of said second circular buffer is in accordance with an inverted system clock;

a third latch for receiving said output of said multiplexer and providing the time domain multiplexed output in accordance with another system clock, said another system clock having a frequency which is twice that of said system clock; and outputting an output clock related time wise to said time domain multiplexer output with a divider in accordance with said another system clock.

12. A time domain demulitplexing method comprising:

receiving and latching an input signal in first and second latches, said first latch latching said input signal in accordance with an input clock and said second latch latching said input signal in accordance with an inverted input clock, said input clock being related time wise to said input signal;

sequentially storing outputs of said first and second latches respectively in first and second circular buffers, said first circular buffer storing said outputs of said first latch in accordance with said input clock and said second circular buffer storing said outputs of said second latch in accordance with said inverted input clock; and respectively storing outputs of said first and second circular buffers in third and fourth latches, outputs of said third and fourth latches being time domain demulitplexed signals corresponding to said input signal, said third latch latching said output of said first circular buffer in accordance with a first output clock signal and said fourth latch latching said output of said second circular buffer in accordance with a second output clock signal, said first circular buffer output being in accordance with said first output clock signal and said second circular buffer output being in accordance with said second output clock signal.

13. A time domain multiplexing/demultiplexing method for multiplexing N input signals into a single output signal, N being an integer greater than 1, and for demulitplexing another input signal into N output signals comprising:

respectively receiving N input signals and N clocks and storing said N input signals in N respective latches in accordance with said N respective clocks;

sequentially storing outputs of said N latches in N circular buffers in accordance with said N respective clocks;

respectively outputting outputs from said N circular buffers into a multiplexer in accordance with N respective system clocks;

selectively outputting one of said respective outputs of said N circular buffers to an output latch in accordance with a multiplexer clock input, said output latch latching said output of said multiplexer in accordance with another system clock having a frequency which is N times that of said N input clocks, an output of said output latch providing a time domain multiplexed signal corresponding to said N input signals; and a divider for outputting an output clock in response to said another system clock;

receiving and latching said another input signal in N other latches, each of said other latches latching said another input signal in response to a respective one of N other input clocks;

sequentially storing outputs of said N other latches in N respective other circular buffers in accordance with N respective other input clocks;

latching respective outputs of said N other circular buffers in N other output latches in accordance with N respective other output clock inputs, said outputs of said N respective other circular buffers being in accordance with said respective and output clock inputs;

wherein outputs of said N other output latches comprise said N respective output signals.

14. A time domain multiplexer/demultiplexer apparatus for multiplexing N input signals into a single output signal, N being an integer greater than 1, and for demultiplexing another input signal into N output signals, said apparatus comprising:

N latches for respectively receiving first through Nth input signals at data inputs thereof and first through Nth input clock signal inputs at latch inputs thereof, each of said input clock signals being related time wise to its respective data input signal;

first through Nth circular buffers, said first through Nth circular buffers having data inputs for receiving respective outputs of said first through Nth latches and having input clock inputs for respectively receiving said first through Nth input clock signals;

a multiplexer having N data inputs for respectively receiving data outputs of said first through Nth circular buffers and having a multiplexer input for receiving a multiplexer input signal, said multiplexer selectively outputting one of said outputs of said first through Nth circular buffers in accordance with said multiplexer input signal, said first through Nth circular buffers having output clock inputs for respectively receiving first through Nth system clock inputs;

an output latch having a data input for receiving said output of said multiplexer and having a latch input for receiving an output system clock having a frequency N time that of said first through Nth system clocks; and a divider having a clock input for receiving said output system clock, said divider dividing the frequency of said output system clock by N;

wherein an output of said output latch serves as an output of said time domain multiplexer and an output of said divider serves as an output clock of said time domain multiplexer;

first through Nth other latches, said first through Nth other latches having a data input connected to another input signal to be demultiplexed and having respective latch inputs connected to first through Nth respective other input clock inputs;

first through Nth other circular buffers, said first through Nth other circular buffers having a data input respectively connected to an output of said first through Nth other latches and having an input clock input respectively connected to said first through Nth other input clocks; and first through Nth other output latches, said first through Nth other output latches having data inputs respectively connected to a data output of said first through Nth other circular buffers and having latch inputs respectively connected to first through Nth other output clock input signals, said first through Nth other circular buffers having an output clock input respectively connected to said first through Nth other output clock input signals;

wherein respective outputs of said first through Nth other output latches form said time domain demultiplexer outputs.

15. The apparatus of claim 14, each of said N latches, and said output latch, and each of said N other latches and N other output latches comprising a flip flop.

\* \* \* \* \*

UNITED STATES PATENT AND TRADEMARK OFFICE
CERTIFICATE OF CORRECTION

PATENT NO. : 6,628,679 B1
DATED : September 30, 2003
INVENTOR(S) : Wieslaw Talarek

It is certified that error appears in the above-identified patent and that said Letters Patent is hereby corrected as shown below:

Column 6,
Line 62, change "demultiplexed" to -- demultiplexer --.

Column 7,
Line 46, change "time that of" to -- times that of --.

Signed and Sealed this

Twenty-fourth Day of January, 2006

JON W. DUDAS
*Director of the United States Patent and Trademark Office*